(12) United States Patent
Ogino et al.

(10) Patent No.: US 7,191,619 B2
(45) Date of Patent: Mar. 20, 2007

(54) PROCESS FOR PRODUCING GLASS AND GLASS-MELTING APPARATUS THEREOF

(75) Inventors: Kazuo Ogino, Tokyo (JP); Jun Ichinose, Tokyo (JP); Yasuko Katoh, Tokyo (JP); Rieko Kudo, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 11/119,738

(22) Filed: May 3, 2005

(65) Prior Publication Data

US 2005/0188726 A1    Sep. 1, 2005

Related U.S. Application Data

(62) Division of application No. 09/930,476, filed on Aug. 16, 2001, now Pat. No. 7,010,940.

(30) Foreign Application Priority Data

Aug. 17, 2000 (JP) ............................. 2000-247440

(51) Int. Cl.
*C03B 5/193* (2006.01)
*C03B 5/16* (2006.01)
*C03B 5/167* (2006.01)

(52) U.S. Cl. .................... 65/347; 65/134.4; 65/134.5; 65/134.6; 65/135.9; 65/335; 65/DIG. 16

(58) Field of Classification Search ............... 65/135.2, 65/134.1, 134.4, 134.5, 134.9, 135.9, 136.2, 65/29.16, 29.17, 32.5, 335, 346, 347, DIG. 16
See application file for complete search history.

(56) References Cited

U.S. PATENT DOCUMENTS

| | | | | |
|---|---|---|---|---|
| 3,260,587 A | * | 7/1966 | Dolf et al. ................. | 65/134.5 |
| 3,489,547 A | * | 1/1970 | Plumat ....................... | 65/347 |
| 3,847,624 A | | 11/1974 | Broemer et al. | |
| 3,929,440 A | * | 12/1975 | Oldfield ..................... | 65/32.5 |
| 3,997,313 A | | 12/1976 | Alexander | |
| 4,019,888 A | * | 4/1977 | Verhappen et al. ........ | 65/134.5 |
| 4,076,541 A | | 2/1978 | Rapp | |
| 4,539,032 A | * | 9/1985 | Tran et al. .................. | 65/32.5 |
| 4,806,138 A | | 2/1989 | Miura et al. | |
| 4,857,487 A | | 8/1989 | Broemer et al. | |
| 4,883,523 A | | 11/1989 | Lee et al. | |
| 4,919,699 A | | 4/1990 | Matsukawa et al. | |
| 4,983,198 A | | 1/1991 | Ogino | |
| 5,215,563 A | | 6/1993 | LaCourse et al. | |
| 5,246,892 A | | 9/1993 | Yanagita et al. | |

(Continued)

FOREIGN PATENT DOCUMENTS

| | | |
|---|---|---|
| JP | 60-81042 | 9/1985 |
| JP | 62-100452 | 9/1987 |
| JP | 62-223028 | 10/1987 |

(Continued)

OTHER PUBLICATIONS

Fischer Platinum Metals Rev., 1992, 36, (1), 14-25 Reduction of Platinum Corrosion in Molten Glass.

(Continued)

*Primary Examiner*—Eric Hug
(74) *Attorney, Agent, or Firm*—Nixon & Vanderhye P.C.

(57) ABSTRACT

A process for producing a high-quality glass from highly reactive raw materials and a glass-melting apparatus for use therewith, comprising the step of charging a material for the glass to a molten glass in a heated vessel, (1) wherein an oxidizing gas is bubbled in the molten glass and a glass raw material that behaves as a reducing agent during being melted is charged into a position of the bubbling or (2) said vessel is filled with a dry ambient gas and while the ambient gas is allowed to flow to a liquid surface of the molten glass along an charging route of the glass raw material, the glass raw material is charged.

8 Claims, 1 Drawing Sheet

U.S. PATENT DOCUMENTS

| | | |
|---|---|---|
| 5,334,232 A | 8/1994 | France et al. |
| 5,509,951 A | 4/1996 | Baucke et al. |
| 5,728,190 A * | 3/1998 | Pieper et al. ............... 65/134.4 |
| 6,334,337 B1 * | 1/2002 | Macedo et al. ............ 65/134.5 |
| 6,722,161 B2 | 4/2004 | LeBlanc |
| 6,769,272 B2 | 8/2004 | Roeth et al. |
| 2002/0092325 A1 | 7/2002 | Muschik |

FOREIGN PATENT DOCUMENTS

| | | |
|---|---|---|
| JP | 63-035434 | 2/1988 |
| JP | 8-25749 | 3/1996 |

OTHER PUBLICATIONS

Official Action of the German Patent Office dated Sep. 3, 2004 with English translation.

* cited by examiner

PROCESS FOR PRODUCING GLASS AND GLASS-MELTING APPARATUS THEREOF

CROSS REFERENCE TO RELATED APPLICATION

This application is a divisional of application Ser. No. 09/930,476 filed Aug. 16, 2001, now U.S. Pat. No. 7,010,940, the entire content of which is hereby incorporated by reference in this application.

FIELD OF THE INVENTION

The present invention relates to a process for producing a glass, and a glass-melting apparatus therefor. More specifically, it relates to a glass production process for producing a high-quality glass from highly reactive materials, and a glass-melting apparatus therefor.

PRIOR ART OF THE INVENTION

An optical glass that has a low refractive index [nd] and a large Abbe's number [vd] and exhibits the property of positive anomalous dispersion is one of essential glasses used for correction of secondary spectrum in view of optical design. Such an optical glass includes a fluorophosphate glasses disclosed in JP-A-60-81042 and JP-A-62-100452.

A fluorophosphate glass can be produced by providing a metaphosphate $M(PO_3)_x$ and a fluorine compound $MF_x$ (in which M is an alkali metal element, an alkaline earth metal element or other metal element and x is a valence of M) as raw materials and melting these raw materials.

Although the above fluorophosphates glass is a useful glass, the raw materials for the glass show very intense corrosive properties when melted. There is therefore involved the following problem. Even if a vessel made of platinum having excellent anti-corrosion properties is used for the melting, the raw materials corrode the platinum, and the corroded platinum is included in a molten glass in the form of fine particles, to constitute a source for light scattering, so that the glass is degraded in quality.

For decreasing the glass contamination caused by embrittlement and damage of a melting vessel and for defoaming and homogenization of a glass, therefore, there has been proposed a process for producing a glass having a large content of fluorine (JP-B-8-25749). In this process, however, the contamination of a glass caused by the above corrosion of a vessel cannot be completely prevented although there can be produced an effect on promoting the defoaming. There is still another problem that the composition of raw materials is inevitably limited.

There is also reported a process for decreasing the contamination of platinum, in which metaphosphate $M(PO_3)_x$ that is a raw material for a phosphate glass is heat-treated and then melted ["Platina-Metals Review", vol. 36, No. 1, pages 14–25 (1992)]. In this process, the raw material for the glass is heat-treated at 920 to 1,050° C. and then melted. The above process will cause no problem so long as a metaphosphate raw material having a high vitrification temperature of 1,100 to 1,200° C. is used alone. However, the above process is not applicable to a mixture containing a fluorine compound material that vitrifies at 700 to 1,000° C., so that it cannot be applied to a glass composition material having a vitrification temperature of 1,000° C. or lower such as a fluorophosphate glass. When an attempt is nevertheless made to apply the above process, it is required to employ the step of heat-treating the $M(PO_3)_x$ raw material and the step of mixing the heat-treated $M(PO_3)_x$ raw material with the fluorine compound MFx raw material that is another raw material, which causes a problem that the production process is complicated and that the production cost inevitably increases.

Further, melting of fluorophosphate glass raw materials causes the following undesirable situations. That is, a reaction product from a raw material and vapor from a glass or water in atmosphere solidifies in a melting vessel, vapor from a glass or water in atmosphere reacts with glass raw material clogs a raw material inlet, or a formed solid drops into a molten glass to cause intense foaming or remains as a non-melted substance in a glass. As a result, there is caused a problem that the glass quality is degraded or that the productive yield decreases.

For the above reasons, it is difficult to produce a high-quality fluorophosphate glass at a mass-production level under the present conditions.

Melting a borosilicate glass also causes a problem similar to the problem caused by melting of a fluorophosphate glass. That is, glass raw materials release a large amount of water during melting to clog a raw material inlet, or boric acid evaporates to undergo solidification in a melting vessel.

Problems to be Solved by the Invention

Under the circumstances, it is an object of the present invention to provide a process for producing a glass, in which a high-quality glass can be produced from a glass raw material which shows high reactivity during being melted or contains a highly volatile component like a material used in the production of a fluorophosphate glass or a borosilicate glass, and a glass-melting apparatus to be used in the process.

Means to Solve the Problems

For achieving the above object, the present inventors have made diligent studies and, as a result, have found that the above object can be achieved by a process in which an oxidizing gas is bubbled in a molten glass and at the same time a glass raw material that behaves as a reducing agent during being melted is charged in a position of the bubbling, or a process in which a vessel is filled with a dry ambient gas and while the ambient gas is allowed to flow to a liquid surface of a molten glass through an charging route of a glass raw material, the glass raw material is charged, and a glass-melting apparatus specifically structured to carry out the above process. The present invention has been completed on the basis of the above finding.

That is, according to the present invention, (1) there is provided a process for producing a glass, which comprises the step of charging a glass raw material into a molten glass in a heated vessel to melt the glass raw material, wherein an oxidizing gas is bubbled in the molten glass and a glass raw material that behaves as a reducing agent during being melted is charged into a position of the bubbling (to be referred to as "production process I" hereinafter).

(2) There is also provided a process for producing a glass, which comprises the step of charging a glass raw material into a molten glass in a heated vessel to melt the glass raw material, wherein said vessel is filled with a dry ambient gas and while the ambient gas is allowed to flow to a liquid surface of the molten glass along an charging route of the glass raw material, the glass raw material is charged (to be referred to as "production process II" hereinafter).

(3) There is further provided a glass-melting apparatus for obtaining a molten glass by charging a glass raw material and heating the glass raw material to melt it, the apparatus comprising, as essential elements, a vessel for melting the glass raw material, an oxidizing gas supply port for supplying an oxidizing gas to a molten glass in the vessel, and a raw material charging port positioned above said oxidizing gas supply port, for charging the glass raw material (to be referred to as "glass-melting apparatus I" hereinafter).

(4) There is still further provided a glass-melting apparatus for obtaining a molten glass by charging a glass raw material and heating the glass raw material to melt it, the apparatus comprising, as essential elements, a vessel for heating and melting a glass raw material and for preserving an obtained molten glass, a raw material charging port provided in communication and contact with the vessel, an ambient gas supply port for supplying a dry ambient gas to fill the vessel therewith, and an ambient gas discharge outlet for discharging said ambient gas, the vessel having an inside that is divided to form an ambient gas passage that leads from the ambient gas supply port to a liquid surface of the molten glass along a glass raw material charging route and reaches the gas discharge outlet (to be referred to as "glass-melting apparatus II" hereinafter).

PREFERRED EMBODIMENTS OF THE INVENTION

Figure 1:
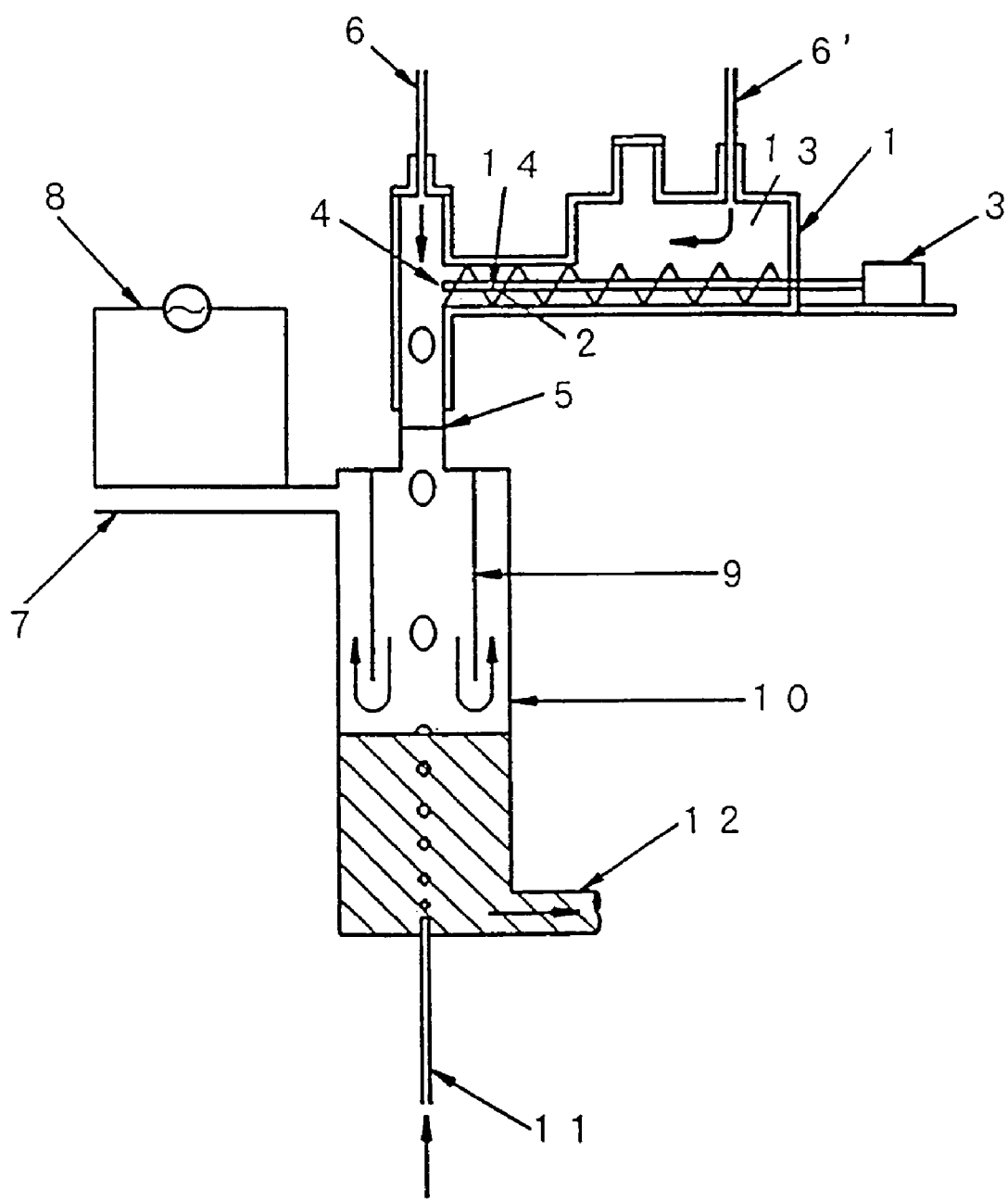
FIG. 1 is a schematic vertical cross-sectional view of a glass-melting apparatus of the present invention used in Examples.

The process for producing a glass, provided by the present invention, is a glass production process comprising the step of charging a raw material for the glass to a molten glass in a heated vessel, and the process includes two embodiments. That is, (1) one is a process wherein an oxidizing gas is bubbled in the molten glass and a glass raw material that behaves as a reducing agent during being melted is charged into a position of the bubbling (production process I), and (2) the other is a process wherein said vessel is filled with a dry ambient gas and while the ambient gas is allowed to flow to a liquid surface of the molten glass along an charging route of the glass raw material, the glass raw material is charged (production process II).

In the above production process I, the "glass raw material that behaves as a reducing agent during being melted" refers to a material that generates a substance that will corrode the above vessel (particularly, made of platinum or a platinum alloy) during being melted, and the above glass raw material includes raw materials for a phosphate glass. Further, the above "oxidizing gas" refers to a gas that oxidizes the above corrosive substance, and it includes an oxygen gas.

The above production process I is preferably used when a metaphosphate compound is used as a raw material for a glass and a phosphate glass is melted, and it is particularly preferably used when a metaphosphate compound and a fluorine compound are used as raw materials for a glass and a fluorophosphate glass is melted.

The above production process II is preferably used when a fluorine compound is used as a raw material for a glass and a fluoride glass is melted, and it is particularly preferably used when a fluorine compound and a metaphosphate compound are used as raw materials for a glass and a fluorophosphate glass is melted. Alternatively, it is preferably used when a borate compound is used as a raw material and a borate-containing glass is melted.

A fluorophosphate glass is an optical glass that has a high vd value due to a fluorine element and has a large positive anomalous dispersion properties, and it is produced from a fluorine compound $MF_x$ and a metaphosphate compound $M'(PO_3)_{x'}$ by melting them. In the above formulae, each of M and M' represents a metal element, for example, one or a plurality of metal atoms selected from alkali metal elements, alkaline earth metal elements or other metal elements, and of x and x' are valences of M and M'.

The raw material for the fluorophosphate glass includes a formulated mixture containing aluminum fluoride $AlF_3$, magnesium fluoride $MgF_2$, calcium fluoride $CaF_2$, strontium fluoride $SrF_2$, yttrium fluoride $YF_3$ (these are all fluorine compounds), aluminum metaphosphate $Al(PO_3)_3$ and barium metaphosphate $Ba(PO_3)_2$ (these are all metaphosphate compounds). In addition, $KPO_3$, $NaPO_3$, $H_3PO_4$, $P_2O_5$, $Nd_2(PO_3)_3$, etc., may be used. The phosphoric acid compounds are used as a raw material for phosphate glass.

The above glass raw material is poured into a molten glass heated at approximately 800 to 1,000° C. in a vessel. Of the above glass raw materials, the metaphosphate compounds $M(PO_3)_x$ are decomposed when melted, to generate free phosphorus that exhibits strong reducing activity. The free phosphorus corrodes a vessel made of platinum, and platinum fine particles formed by the corrosion are included in a molten glass and constitute a light-scattering source, which causes the glass quality to be degraded.

For overcoming the above problem, the present invention can employ the above production process I and II. The production process I will be explained first.

In the production process I of the present invention, an oxidizing gas is supplied to a molten glass to bubble it. And, the metaphosphate compounds are charged into the bubbling position of the oxidizing gas. The metaphosphate compounds are decomposed to generate free phosphorus that exhibits strong reducing activity. However, the free phosphorus is oxidized with bubbles of the oxidizing gas before it comes in contact with the internal surface of the vessel, so that the corrosion of the vessel is prevented.

As described above, the free phosphorus that is a decomposition product from the metaphosphate compounds is oxidized, whereby the melting of the glass is promoted and a phosphate glass can be efficiently obtained.

The oxidizing gas not only oxidizes the free phosphorus but also causes an upward convection current in the charging position of the metaphosphate compounds. Normally, the charged raw material sediments and reaches a bottom of the vessel. However, the convection current caused by the bubbling decreases the sedimentation rate of the raw material. The raw material is therefore decomposed before it reaches the bottom of the vessel, and the generated free phosphorus is also oxidized, so that the corrosion of the bottom of the vessel can be effectively prevented.

In the above production process I, preferably, the oxidizing gas is bubbled in the central position of liquid surface of a molten glass, and the metaphosphate compounds are charged into the bubbling position. In this manner, it is made difficult for the free phosphorus generated by the decomposition of the raw material to reach the wall surface of the vessel, and the molten glass in the vessel is stirred.

The oxidizing gas for the above bubbling is preferably selected from dry oxygen-containing gases such as an oxygen gas and a mixture of an oxygen gas with an inert gas. The oxidizing gas is preferably used in a dry state as will be explained later, and the oxidizing gas is preferably a gas that can constitute a bubbling gas having a water content of 4.25% by volume or less or a dew point of −70° C. or lower. The oxygen gas is preferably supplied at a rate of 50 to 500 cc/minute.

In the fluorine compounds for use as raw materials for a glass, the bonding and dissociation energy between fluorine and a metal is generally at least 500 kJ/mol, such as 511.7 kJ/mol between F—Mg, 587.7 kJ/mol between F—Al, 556.17 kJ/mol between F—Ca. On the other hand, the bonding and dissociation energy between O—Mg is 336.87 kJ/mol, and that between O—Al is 478.7 kJ/mol, or these energies are smaller than those energies with F, so that no bubbling oxygen gas purges the glass of fluorine by breaking the bond of fluorine and the metals. The oxygen gas therefore oxidizes the free phosphorus but rarely decreases the content of fluorine in the glass, so that the oxygen gas is preferred as a bubbling gas for the production of the fluorophosphate glass. When the fluorophosphate glass is used as an optical glass, particularly, it is required to have a low refractive index and low dispersion properties. If fluorine is completely replaced with oxygen, the vd value (Abbe's number) decreases. When a dry oxygen gas is selected as an oxidizing gas, however, the decrease in the vd value can be prevented.

Although differing depending upon the supply amount of the raw materials and the output of a molten glass, the flow rate of the oxidizing gas is preferably 1 to 4 liters/minute. Further, the oxidizing gas is preferably adjusted to have a temperature of 20 to 60° C. outside the melting vessel before supplied into the melting vessel, and it is preferably adjusted to have a temperature of 700 to 800° C. when supplied to the molten glass.

The depth of the molten glass in a position where the raw material is charged (height difference between the bottom of the vessel and the liquid surface of the molten glass in the position) is increased, and the charging height (distance) of the raw material, measured from the liquid surface of the molten glass, is decreased. In this case, the time period for which the charged raw material reaches the bottom of the vessel can be increased, whereby the corrosion of the vessel wall can be prevented even if the raw material that is corrosive is charged in a large amount. For attaining the above effect without bringing the raw material charging port too close to the liquid surface of the molten glass, the depth of the molten glass in the position where the glass raw material is charged is adjusted preferably to be 1.5 to 3 times, more preferably to be 1.6 to 2.5 times, as large as the charging height (distance) of the glass raw material measured from the liquid surface of the molten glass. The liquid surface of the molten glass can be controlled by controlling the supply amount of the glass raw material to the molten glass or the withdrawal amount of the molten glass or by controlling both the above supply amount and withdrawal amount.

Preferably, the glass raw material is supplied by continuously charging it. When there is employed a process in which the glass raw material is intermittently charged, for producing a constant amount of a glass, the amount of the glass raw material that is charged each time increases, and a large amount of free phosphorus is generated at once. In the continuous charging, the charging amount can be averaged relative to a time, and generated free phosphorus can be reliably oxidized, which is advantageous in view of the prevention of corrosion of the vessel and promotion of melting of the glass.

It is therefore preferred to continuously introduce the glass raw material and continuously withdraw molten glass so that the liquid surface of the molten glass is maintained in the above range.

The molten glass is transferred to a refining vessel through the withdrawal outlet of the vessel, refined and stirred to come to be a homogeneous and high-quality glass free of fine particles and bubbles that are to constitute light scattering sources. The glass has a high quality so that it is suitable for use as an optical glass, and it can be used for optical elements such as a lens, a prism and an optical fiber, and a laser glass.

While the above process has been explained with reference to the melting of a fluorophosphate glass as an example, it can be also applied to the melting of a phosphate glass.

The production process II will be explained below.

The fluorine compound as a raw material for a fluorophosphate glass includes many compounds that easily sublimate, such as $AlF_3$ (which sublimates at 1,260 to 1,272° C.). When brought into contact with steam at 300 to 400° C., $AlF_3$ is partially decomposed to generate hydrogen fluoride and aluminum oxide. $AlF_3$ has a vapor pressure of 2.19 kPa (1,098° C.) or 0.102 MPa (1,294° C.). $P_2O_5$ has the property of undergoing easily vaporization. When an ambient atmosphere with which a molten glass comes in contact contains OH groups or steam, $AlF_3$ vapor and $P_2O_5$ vapor react with the OH group or the $H_2O$ steam, to form sparingly soluble $AlPO_4$, and the $AlPO_4$ undergoes solidification above the liquid surface of the molten glass in the melting vessel. The solidified $AlPO_4$ drops on the glass at irregular intervals to be included in the molten glass. When $AlPO_4$ drops into the molten glass, it reacts while fiercely bubbling and leaves bubbles in the glass. Further, since $AlPO_4$ has a very high melting point of at least 1,500° C., it is not easily melted when dropped into the molten glass. As a result, $AlPO_4$ that has dropped remains as fine matter to cause particulate scattering, and it greatly degrades the glass quality. When the temperature for melting the glass is set at a temperature higher than approximately 1,100 to 1,150° C. for melting the above fine matter, an easily sublimating material may be extracted from the glass, and it is made difficult to obtain a glass having an intended composition.

A glass having a large content of fluorine in place of oxygen for attaining a large vd value, such as a fluorophosphate glass, is liable to react with water, so that it is required to avoid a direct contact of water to a molten glass and inclusion of steam in a melting atmosphere in a melting step. When a fluorophosphate glass in a molten state comes in contact with OH group or steam, a fluorine ion is replaced with an oxygen ion, and fluorine is extracted from the glass in the form of HF gas. As a result, the stability of the glass is degraded, or the vd value for use as an optical glass decreases. The generated HF gas is toxic and exerts a detrimental effect on environments.

For obtaining a high-quality fluorophosphate glass by overcoming the above problems, it is required to decrease the content of water and OH groups in a molten glass and a melting ambient atmosphere. In the production process II, therefore, in the step of charging a raw material for a fluorophosphate glass into a fluorophosphate glass in a molten state, which fluorophosphate glass is accumulated in a heated vessel, the vessel is filled with a dry ambient gas, and the glass raw material is charged while a dry ambient gas is allowed to flow to the liquid surface of the molten glass along the charging route of the glass raw material.

In the above process, the vessel is internally filled with an ambient gas in a dry state, and the water content in the atmosphere can be decreased. Further, since ambient gas is charged to the liquid surface of the molten glass along the charging route of the glass raw material, water that may be absorbed in the glass raw material is mingled with the ambient gas, so that the content of water absorbed in the charged glass raw material can be decreased. The ambient gas is discharged from the vessel after it reaches the liquid surface of the molten glass, the atmosphere in the vessel is kept in a dry state, and the reaction of the molten glass with OH group or water can be prevented.

Further, the ambient gas that is allowed to flow along the charging route of the glass raw material prevents the following; A gas that is generated from the molten glass reaches the glass raw material supply port to solidify the glass raw material, so that the supply port is clogged, or glass raw material flies upward due to upward gas current to clog the raw material supply port.

The dry ambient gas is preferably selected from a dry inert gas, a dry oxygen gas or a dry mixture of an inert gas and an oxygen gas.

Further, for preventing glass vapor of the above $AlPO_4$, $AlF_3$ and other fluorine compound from undergoing solidification and clogging the gas discharge outlet through which the ambient gas is to be discharged, the gas discharge outlet is heated such that the temperature of the gas discharge outlet is preferably at least 600° C., more preferably at least 700° C.

When the glass raw material is continuously charged, the vessel is internally adjusted with the dry ambient gas to have a positive pressure as against the outside of the vessel, whereby water vapor can be prevented from entering the vessel together with the glass raw material. Preferably, the pressure inside the vessel and the pressure outside the vessel are adjusted to differ from each other by 10 to 30 Pa or more.

The molten glass is transferred to a refining vessel through the withdrawal outlet of the vessel, refined and stirred to come to be a homogeneous and high-quality glass free of fine particles and bubbles that are to constitute light scattering sources. The glass has a high quality so that it is suitable for use as an optical glass, and it can be used for optical elements such as a lens, a prism and an optical fiber, and a laser glass.

While the above process has been explained with reference to the melting of a fluorophosphate glass as an example, it can be also applied to the melting of a phosphate glass.

Further, the above process can be applied to the melting of a borate-containing glass, such as a borosilicate glass. The borate-containing glass generates a large amount of water, and boric acid has volatility, so that the borate-containing glass has a problem that glass vapor is liable to form a solid above the liquid surface of a glass in a melting vessel. In the production of the borate-containing glass as well, the ambient gas is allowed to flow in the same manner as above, a predetermined flow line is formed in a melting vessel, and the glass raw material is supplied by the same method as that described above, whereby the problem caused by solidification of glass vapor can be overcome, so that the glass raw material can be smoothly supplied, and a quality glass can be produced with good productive yield.

In the production process II, a glass can be also melted as follows. An oxidizing gas is bubbled in a molten glass like the already explained production process I, the vessel is also filled with a dry ambient gas, and while the dry ambient gas is allowed to flow to the liquid surface of the molten glass along the charging route of the glass raw material, the glass raw material that behaves as a reducing agent during being melted is charged into a position of the bubbling in the molten glass like the already explained production process I.

In the position where bubbling gas comes out (which is also the position where the glass raw material is charged), an upward convection current is caused in an atmosphere. Since, however, the ambient gas is allowed to flow along the charging route of the material, upward flowing of the glass raw material can be prevented. The ambient gas works to accompany bubbling gas that has come out of the liquid surface of the molten glass, to the gas discharge outlet, and there is no risk of oxidizing gas remaining stagnant in the vessel. The above process is suitable for the production of a phosphate glass, a fluoride glass, a fluorophosphate glass and a borate-containing glass such as borosilicate glass, and can be also applied to the production of a low-viscosity silicate glass.

The molten glass obtained by the above process is transferred to a refining vessel through the withdrawal outlet of the vessel, refined and stirred to come to be a homogeneous and high-quality glass free of fine particles and bubbles that are to constitute light scattering sources. The glass has a high quality so that it is suitable for use as an optical glass, and it can be used for optical elements such as a lens, a prism and an optical fiber, and a laser glass.

The glass-melting apparatus of the present invention is an apparatus for obtaining a molten glass by charging a glass raw material and heating the glass raw material to melt it, and the apparatus includes two embodiments. That is, (1) one is an apparatus comprising, as essential elements, a vessel for melting the glass raw material, an oxidizing gas supply port for supplying an oxidizing gas to a molten glass in the vessel, and a raw material charging port positioned above said oxidizing gas supply port, for charging the glass raw material (glass-melting apparatus I), and (2) the other is an apparatus comprising, as essential elements, a vessel for heating and melting a glass raw material and for preserving an obtained molten glass, a raw material charging port provided in communication and contact with the vessel, an ambient gas supply port for supplying a dry ambient gas to fill the vessel therewith, and an ambient gas discharge outlet for discharging said ambient gas, the vessel having an inside that is divided to form an ambient gas passage that leads from the ambient gas supply port to a liquid surface of the molten glass along a glass raw material charging route and reaches the gas discharge outlet (glass-melting apparatus II).

First, the glass-melting apparatus I will be explained.

In the glass-melting apparatus I, the vessel for melting a glass raw material is externally provided with a heater for heating a molten glass preserved in the vessel and the glass raw material charged into the vessel. In a bottom portion of that portion of the vessel which is to preserve the molten glass, there is provided one or a plurality of oxidizing-gas supply ports for supplying an oxidizing gas such as a dry oxygen gas. Above the oxidizing gas supply port, there is provided a raw material charging port for charging a glass raw material into the vessel. A plurality of raw material charging ports may be provided. When the present apparatus is operated, a molten glass is preserved in the vessel and an oxidizing gas is charged into the molten glass from the above oxidizing gas supply port to carry out bubbling.

The glass raw material is charged through the material charging port and drops to a position where the molten glass is bubbled with the oxidizing gas. The charged glass raw material is decomposed, to generate an intermediate product that exhibits intense reducing properties. However, the raw material is readily oxidized due to bubbling of the oxidizing gas, so that the corrosion of the internal wall of the vessel is prevented, and the melting of the glass is promoted.

The glass raw material charging port is structured so that the charged raw material comes in contact with the wall surface of the vessel in few or no case. It is therefore preferred to provide the raw material charging port above the center of the vessel, and it is also preferred to provide the oxidizing gas supply port in the central portion of the vessel so as to match the position of the raw material charging port.

The apparatus I of the present invention is suitable for melting and production of a fluorophosphate glass made from a fluorine compound and a metaphosphate compound as raw materials. The oxidizing gas is preferably selected from an oxygen gas in a dry state or a dry gas containing an oxygen gas. The temperature, the supply amount of the oxidizing gas and other conditions are the same as those explained with regard to the above production process I. Concerning the vessel, preferably, at least a portion with which the molten glass comes in contact is made of platinum or a platinum alloy.

Preferably, the apparatus I has an charging amount mechanism for controlling the charging amount of a glass raw material into the vessel and a withdrawal amount control mechanism for controlling the withdrawal amount of a molten glass from the vessel. Owing to these control mechanisms, the raw material supply amount and the molten glass withdrawal amount can be controlled such that the depth of the molten glass in a position where the glass raw material is charged in the vessel can be 1.5 to 3 times, preferably 1.6 to 2.5 times, the charging height (distance) of the glass raw material measured from the liquid surface of the molten glass, and the charged glass raw material can be melted before the raw material reaches the bottom of the vessel. In this manner, the corrosion of the vessel can be prevented, and the contamination of the glass by the inclusion of a substance constituting the wall surface of the vessel in the molten glass can be prevented.

Further, the above material charging mechanism is preferably according to a process in which the raw material is continuously charged. When the raw material is continuously charged, the charging rate of the raw material is averaged with time, and the formation of a large amount of a reducing substance by decomposition at once can be avoided. One example of the raw material charging mechanism according to a continuous process is as follows. For maintaining the raw material in a dry state, the mechanism has an auxiliary chamber filled with a dry ambient atmosphere and a raw material supply passage extending from the auxiliary chamber to the raw material charging port. Screws are provided in the auxiliary chamber and the supply passage, and the raw material preserved in the auxiliary chamber is extruded to the material charging port through the supply passage by continuously rotating the screw at a constant number of rotation, so that the raw material is continuously charged into the vessel through the charging port.

The above apparatus 1 can be suitably applied to the production of a phosphate glass.

The glass-melting apparatus II will be explained below.

In the glass-melting apparatus II, the vessel is filled with a dry ambient gas as explained in the above production process II, so that the water content in an atmosphere in the vessel can be decreased. Further, since the ambient gas is allowed to flow to the liquid surface of the molten glass along the charging route of the raw material together with the glass raw material, water absorbed in the glass raw material, even if its amount is small, is mixed with the ambient gas, so that the amount of water absorbed in the charged raw material can be decreased. The ambient gas reaches the liquid surface of the molten glass and then discharged from the vessel, and the atmosphere in the vessel is maintained in a dry state, so that the reaction of the molten glass with OH group or water can be prevented.

Further, the ambient gas that is allowed to flow along the charging route of the glass raw material prevents the following; A gas that is generated from the molten glass reaches the glass raw material supply port to solidify the glass raw material, so that the supply port is clogged, or glass raw material flies upward due to upward gas current to clog the raw material supply port.

The apparatus II is suitable as an apparatus for obtaining a fluorophosphate glass by providing a fluorine compound and a metaphosphate compound as raw materials and melting them. In this case, the dry ambient gas is preferably selected from a dry inert gas, a dry oxygen gas or a dry mixture of an inert gas with an oxygen gas.

Further, for preventing the solidification of the above sparingly soluble $AlPO_4$ in the gas discharge outlet from the vessel and the clogging of the gas discharge outlet, it is desirable to provide a gas discharge outlet heater for heating the ambient gas discharge outlet. In the gas discharge outlet heated with the heater, no $AlPO_4$ undergoes solidification, and it is discharged in a gaseous state from the vessel together with the ambient gas. That portion which is for discharging the ambient gas is preferably heated to 600° C. or higher.

In the apparatus II, preferably, the raw material charging mechanism is according to a continuous process like the above apparatus I. For preventing water from entering from an outside of the vessel as the raw material is supplied, it is preferred to provide a device for adjusting the pressure of the dry ambient gas such that the inside of the vessel has an positive pressure as against the outside of the vessel.

Preferably, the vessel is internally divided with a partition wall that extends from the raw material charging port to the vicinity of liquid surface of the molten glass so as to surround the raw material charging passage, and the ambient gas discharge outlet is provided in a portion spaced from the raw material charging port with the partition wall. When the partition wall is provided as described above, the ambient atmosphere in the vessel can be constantly replaced, and the ambient gas can be allowed to reliably flow along the predetermined line above. Further, the charged raw material can be reliably charged into the molten glass, and the discharging of raw material through the gas discharge outlet can be prevented.

Preferably, the vessel has a cylindrical form, and preferably, a heating portion for heating the molten glass preserved in the vessel is attached to a side surface of the vessel. Further, the vessel preferably has a control mechanism for controlling at least one of the charging amount of the glass raw material and the withdrawal amount of the molten glass such that the height of liquid surface of the molten glass from the bottom of the vessel is preferably 2.5 to 10 times, more preferably 3 to 6 times the inner diameter of the vessel. The vessel more preferably has a control mechanism for controlling both the charging amount of the glass raw material and the withdrawal amount of the molten glass. This apparatus has characteristic features that the ratio of the contact area between the molten glass and the ambient gas relative to the volume of the molten glass in the vessel can be decreased and that the ratio of the contact area between the molten glass and the vessel relative to the volume of the molten glass can be increased. Due to these features, that area of the molten glass which is to be in contact with the ambient atmosphere can be decreased, a reaction with water and the volatilization amount of glass components can be decreased, and the molten glass can be efficiently heated.

When the height of the liquid surface of the molten glass from the bottom of the vessel is less than 2.5 times the diameter of the bottom of the vessel, it is difficult to attain the above effects. When it is over 10 times as large, it is difficult to supply and discharge the ambient gas stably.

The molten glass is transferred to a refining vessel through the withdrawal outlet of the vessel, refined and stirred to come to be a homogeneous and high-quality glass free of fine particles and bubbles that are to constitute light scattering sources. The glass has a high quality so that it is suitable for use as an optical glass, and it can be used for optical elements such as a lens, a prism and an optical fiber, and a laser glass.

The above apparatus II can be applied not only to the production of a fluorophosphate glass but also to the production of a fluoride glass and the production of a borate-containing glass such as a borosilicate glass.

Further, the melting-apparatus II may have an oxidizing gas supply port for supplying a dry oxidizing gas into the molten glass, and the raw material charging port may be disposed above the oxidizing gas supply port. When the apparatus II has the constitution of the apparatus I as described above, the apparatus II has the feature of the apparatus I, and as explained in the production process II, the apparatus II is suitable for the production of a phosphate glass, a fluoride glass, a fluorophosphate glass and a borate-containing glass such as borosilicate glass, and can be also applied to the production of a low-viscosity silicate glass.

In the glass-melting apparatuses I and II of the present invention, a refining vessel and a stirring vessel may be connected to each melting apparatus as required.

EXAMPLES

The present invention will be explained more in detail with reference to Examples hereinafter, while the present invention shall not be limited by Examples.

Example 1

FIG. 1 shows a schematic vertical cross-sectional view of a glass-melting apparatus of the present invention used in Example 1. A glass-melting vessel 10 is a cylindrical vessel made of platinum and has an inner diameter of 0.28 m and a height of 0.95 m.

In the upper central portion of the vessel 10, there is provided a raw material charging port 5 for charging a raw material into the vessel, and a raw material charging mechanism 1 and an ambient gas supply port 6 are provided so as to be in communication with the raw material charging port 5.

The charging mechanism 1 has an auxiliary chamber 13 where a pre-formulated raw material is to be preserved, a material supply passage 14 for supplying a raw material to the charging port 5, a screw 2 inserted in the material charging passage 14 and the auxiliary chamber 13, a motor 3 for rotating the screw 2, and a control mechanism (not shown) for controlling the supply rate of the raw material. By operating the motor 3, the glass raw material preserved in the auxiliary chamber 13 is extruded to the supply passage 14 with the screw 2, passes the raw material outlet 4 and is charged into the vessel 10 through the raw material charging port 5. The supply rate of the raw material is determined by the number of rotation of the motor 3, and the above control mechanism controls the number of rotation of the motor 3, so that the supply rate of the raw material can be controlled. The auxiliary chamber 13 also has an ambient gas supply port 6' for supplying a dry ambient gas into the auxiliary chamber 13. An ambient gas in a dry state is supplied to the vessel 10 through the above ambient gas supply port 6 and through the ambient gas supply port 6'.

In the centrally upper portion of the vessel 10, a cylindrical partition wall 9 is provided so as to surround the charging passage of the glass raw material charged through the charging port 5. Further, in an upper circumferential portion of the vessel 10, a gas discharge outlet 7 is provided for discharging the ambient gas that is supplied through the ambient gas supply ports 6 and 6' and passes the raw material charging port 5 and the inside of the vessel 10. The gas discharge outlet 7 has a heater 8 for preventing a glass vapor, etc., which are generated during the melting of the glass, from being cooled to undergo solidification and clog the gas discharge outlet. The partition wall 9 is required to have such a length that the flow of the ambient gas is not prevented in a state where the molten glass is preserved in the vessel 10.

The outer surface of the vessel 10 is provided with a heater (not shown) for heating the glass to melt it, and the molten glass is heated through the outer surface of the vessel 10.

A withdrawal outlet 12 for withdrawing the glass melted in the vessel is provided in a circumferential portion of bottom of the vessel 10. The molten glass withdrawn through the withdrawal outlet is transferred to a refining vessel and refined.

A bubbling pipe 11 for supplying an oxidizing gas is provided in the center of bottom of the vessel 10. An oxygen gas in a dry state is supplied to the molten glass through the bubbling pipe 11 to carry out the bubbling with the oxygen gas.

The vessel 10 and the raw material charging mechanism 1 connected thereto are maintained to internally have an positive pressure so that no external air containing water vapors enters except for the ambient gas to be supplied through the ambient gas supply ports 6 and 6' and the oxidizing gas to be supplied through the bubbling pipe 11.

The above glass-melting apparatus was used to melt and produce a fluorophosphate glass. The vessel 10 preserves a molten glass heated to 800 to 1,000° C., preferably 950 to 1,000° C., with the heater provided on the outer surface of the vessel. A dry oxygen gas is supplied into the molten glass through the bubbling pipe 11, to bubble the central portion of the molten glass with the oxygen gas.

A formulated glass raw material is placed in the auxiliary chamber 13 of the raw material charging mechanism 1, and a dry gas (dry oxygen gas, dry inert gas or a mixture of dry oxygen gas and dry inert gas) is continuously supplied through the ambient gas supply ports 6 and 6'.

As a raw material for the fluorophosphate glass, there was used a formulated raw material containing $AlF_3$, $MgF_2$, $CaF_2$, $SrF_2$, $YF_3$ (these are all fluorine compounds), $Al(PO_3)_3$, $Mg(PO_3)_2$, $Ca(PO_3)_2$, $Sr(PO_3)_2$ and $Ba(PO_3)_2$ (these are all metaphosphate compounds).

The ambient gas passes through the raw material charging port 5, is conducted by the partition wall 9 to move toward the liquid surface of the molten glass, passes between the partition wall 9 and the liquid surface of the molten glass, passes between the inner wall surface of the vessel 10 and the partition wall 9 and is discharged through the gas discharge outlet 7. In a state where the vessel 10 is internally filled with the dry ambient gas, the motor 3 of the raw material charging mechanism 1 is rotated at a predetermined number of rotation, to continuously extrude the glass raw material in the auxiliary chamber 13 to the charging port 5. The glass raw material passes through the charging port 5 and through a portion surrounded by the partition wall 9 and drops on the central portion of liquid surface of the molten glass in which the oxygen gas is bubbling. In this case, the ambient gas is allowed to flow along the charging route of the raw material, so that there is no case where the raw material is pushed upward by the convection current in the vessel 10 or the upward current of the bubbling gas. Further, there is prevented a case in which glass vapors generated from the molten glass are absorbed in the glass raw material to adhere to the raw material charging port and hence prevent the charging of the raw material.

Of the charged glass raw material components, the metaphosphate compounds are decomposed in the molten glass to generate free phosphorus having very high reducing properties. However, the free phosphorus is readily oxidized with the oxygen gas that is bubbling in the molten glass, and melted. Therefore, the melting of the glass is efficiently carried out, and the metaphosphate compound and the free phosphorus are prevented from reaching the inner wall of the vessel 10 made of platinum, so that the corrosion of the vessel 10 can be prevented. There is therefore no case where platinum fine particles from the vessel 10 are included in the molten glass.

The ambient gas that moves from the liquid surface of the molten glass to a space between the inner wall surface of the vessel 10 and the partition wall 9 contains glass vapors generated from the molten glass, and the glass vapors react with a suitable amount of water to form sparingly soluble aluminum phosphate, and aluminum phosphate moves toward the gas discharge outlet 7 together with the ambient gas. Since the gas discharge outlet 7 is under heat, the aluminum phosphate is not solidified on the gas discharge port 7, so that the flow of the ambient gas is not hindered. Further, no solidified aluminum phosphate drops on, or is included in, the molten glass, so that a bubbling problem, etc., can be avoided.

The raw material charging rate is controlled with a raw material charging rate control mechanism, and a molten glass withdrawal rate is controlled with a molten glass withdrawal rate control mechanism, whereby the depth of the molten glass (height of the liquid surface of the molten glass from the center of bottom of the vessel) is maintained to be preferably 1.6 to 2.5 times the height (distance) of the glass raw material charging port 5 measured from the liquid surface of the molten glass. Therefore, the raw material charged through the raw material charging port 5 is melted before it reaches the bottom of the vessel, so that no platinum constituting the inner surface of the vessel 10 may be corroded.

Due to the above control of the liquid surface of the molten glass, the depth of the molten glass is maintained preferably to be 3 to 6 times the inner diameter of the vessel 10, so that the ambient-gas-contact area of the molten glass per total volume of the molten glass can be decreased without hindering the flow passage of the ambient gas.

The molten glass obtained in the vessel 10 is transferred to a refining vessel (not shown) through the molten glass withdrawal outlet 12 and refined, to give a high-quality optical glass free of impurities such as remaining bubbles and platinum fine particles.

As described above, while the ambient gas and the bubbling gas were continuously supplied, the glass raw material was continuously charged, whereby a high-quality optical glass free of impurities such as platinum fine particles, etc., and bubbles was continuously produced with good productive yield.

Example 2

A borosilicate glass was melted with the same apparatus as that used in Example 1 in the same manner as in Example 1.

A borosilicate raw material, a silicate raw material and other raw materials were mixed and supplied to the raw material charging mechanism 1. While the dry ambient gas was allowed to flow, the above mixture was continuously charged into a molten glass through the raw material charging port 5, to give a borosilicate glass. In this Example, a high-quality optical glass free of bubbles and impurities was also continuously produced with good productive yield.

Effect of the Invention

High-quality glasses, particularly, a phosphate glass, a fluoride glass, a fluorophosphate glass, a borate-containing glass, etc., can be produced from highly reactive raw materials according to the process for producing a glass and the glass-melting apparatus provided by the present invention.

What is claimed is:

1. A glass-melting apparatus for obtaining a molten glass by charging a glass raw material and heating the glass raw material to melt it, the apparatus comprising, as essential elements, a vessel for heating and melting a glass raw material and for preserving an obtained molten glass, a raw material charging port provided in communication and contact with the vessel, an ambient gas supply port for supplying a dry ambient gas to fill the vessel therewith, and an ambient gas discharge outlet for discharging said ambient gas, the vessel having an inside that is divided to form an ambient gas passage that leads from the ambient gas supply port to a liquid surface of the molten glass along a glass raw material charging route and reaches the gas discharge outlet.

2. The apparatus of claim 1, which has a heating portion for heating the molten glass through a side surface of the vessel having a cylindrical form, and a control mechanism for controlling a glass raw material charging rate and/or a molten glass withdrawal rate so that a height of liquid surface of the molten glass from a bottom of the vessel is 2.5 to 10 times the inner diameter of the vessel.

3. The apparatus of claim 1, which has an oxidizing gas supply port for supplying a dry oxidizing gas into the molten glass, the raw material charging port being provided above the oxidizing gas supply port.

4. A process for producing a glass in the glass-melting apparatus of claim 1, 2 or 3, which process comprises the step of charging a glass raw material into a molten glass in a heated vessel to melt the glass raw material, wherein said vessel is filled with a dry ambient gas and while the ambient gas is allowed to flow to a liquid surface of the molten glass along a charging route of the glass raw material, the glass raw material is charged.

5. The process of claim 4, wherein a fluorine compound is used as a glass raw material, and a fluoride glass is melted.

6. The process of claim 5, wherein a metaphosphate compound is used as a glass raw material, and a fluorophosphate glass is melted.

7. The process of claim 4, wherein a boric acid compound is used as a glass raw material, and a boric-acid-containing glass is melted.

8. The process of claim 4, wherein an oxidizing gas is bubbled in the molten glass and a glass raw material that behaves as a reducing agent during being melted is charged into a position of the bubbling.

* * * * *